May 19, 1970    H. L. KOMBEREC ET AL    3,512,485
MECHANISM FOR PLACEMENT OF SECOND COOKIE ON FROZEN
ICE CREAM SANDWICH ELEMENT
Filed Oct. 16, 1967          3 Sheets-Sheet 1
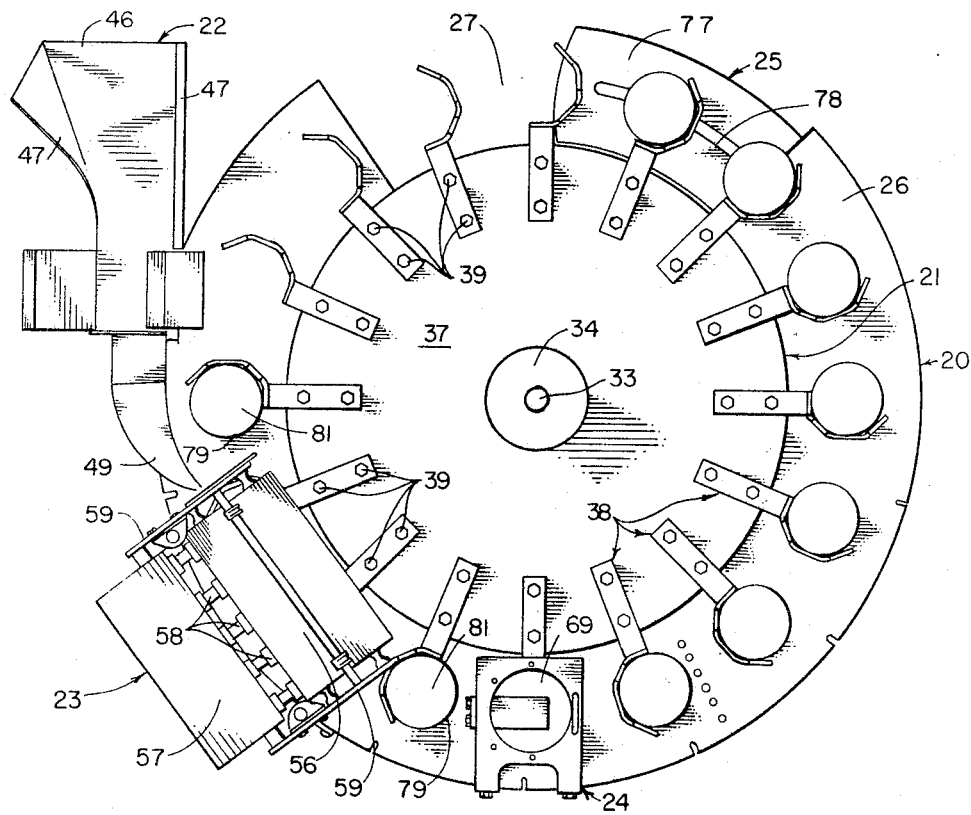
FIGURE 1
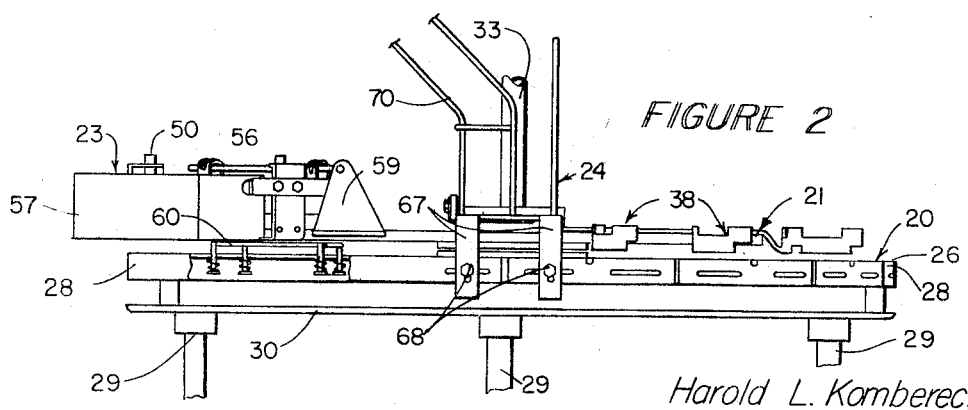
FIGURE 2
Harold L. Komberec,
Dillon K. Kilcup, and
Alfred T. Smith,
INVENTORS
ATTORNEY May 19, 1970  H. L. KOMBEREC ET AL  3,512,485
MECHANISM FOR PLACEMENT OF SECOND COOKIE ON FROZEN
ICE CREAM SANDWICH ELEMENT
Filed Oct. 16, 1967  3 Sheets-Sheet 2
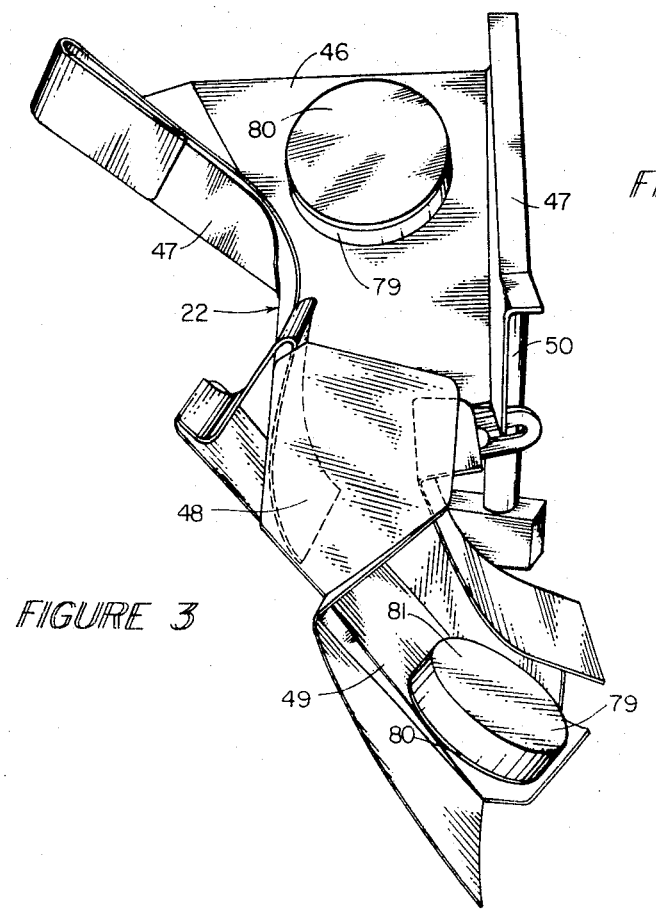
FIGURE 3
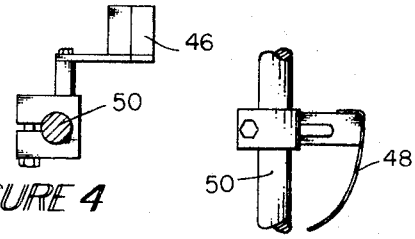
FIGURE 4
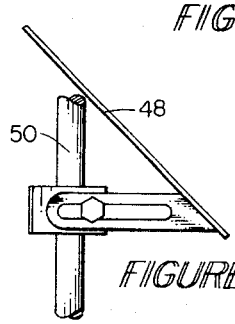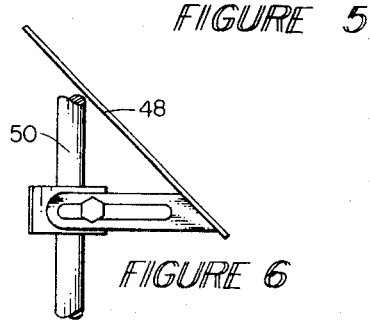
FIGURE 5
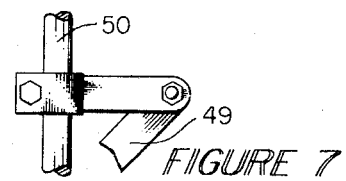
FIGURE 6
FIGURE 7
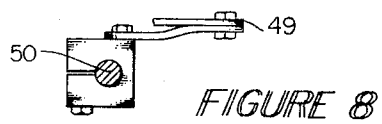
FIGURE 8
FIGURE 17
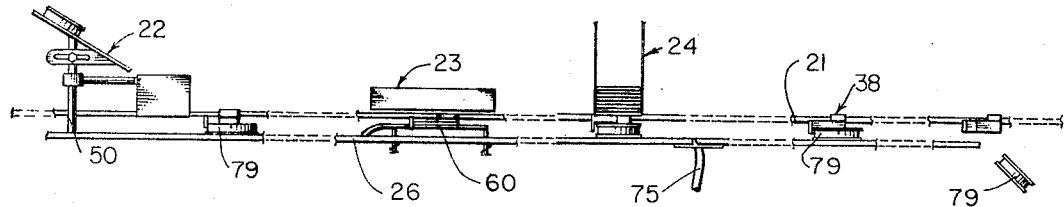
Harold L. Komberec,
Dillon K. Kilcup, and
Alfred T. Smith,
INVENTORS
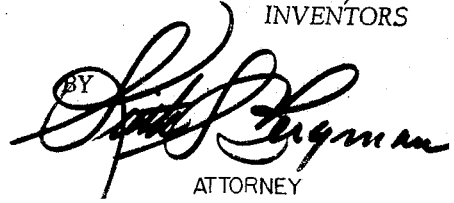
ATTORNEY May 19, 1970  H. L. KOMBEREC ET AL  3,512,485
MECHANISM FOR PLACEMENT OF SECOND COOKIE ON FROZEN
ICE CREAM SANDWICH ELEMENT
Filed Oct. 16, 1967  3 Sheets-Sheet 3
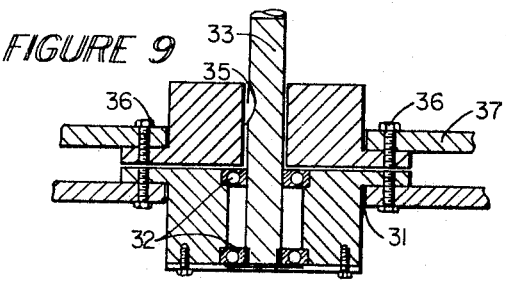
FIGURE 9
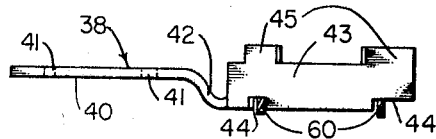
FIGURE 10
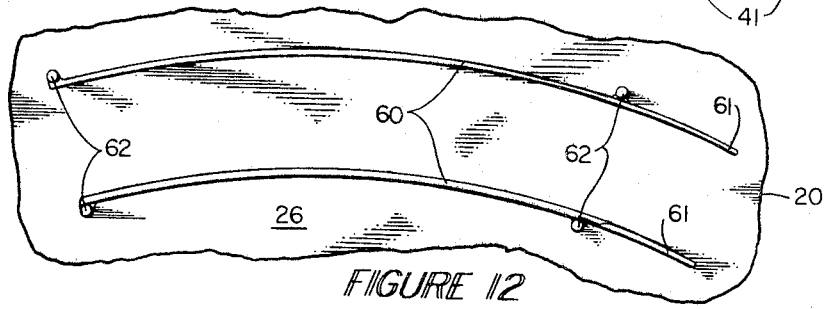
FIGURE 12
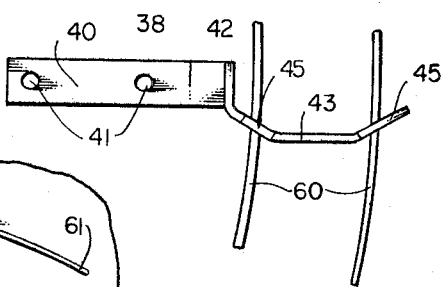
FIGURE 11
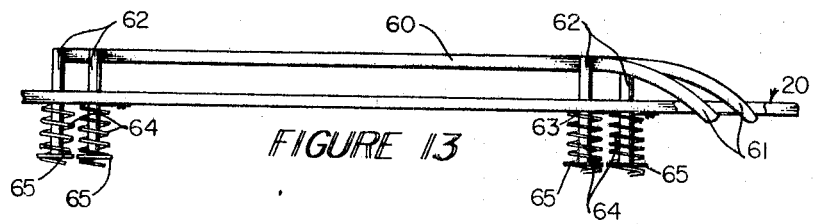
FIGURE 13
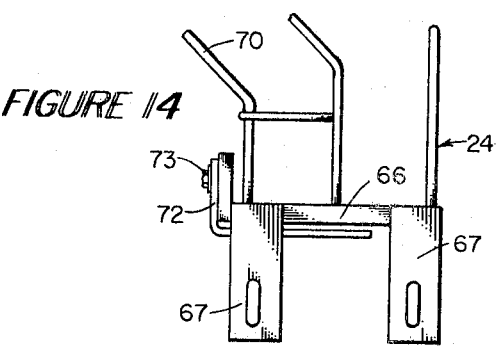
FIGURE 14
FIGURE 15
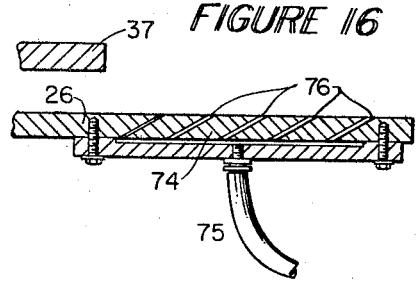
FIGURE 16
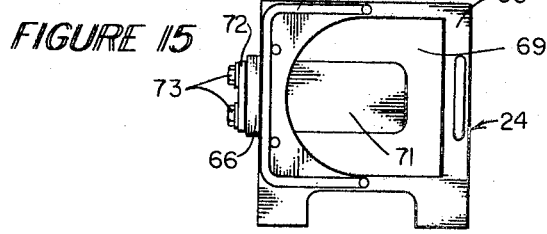
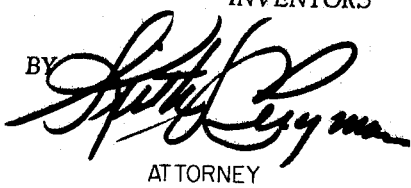
Harold L. Komberec,
Dillon K. Kilcup, and
Alfred T. Smith,
INVENTORS
BY
ATTORNEY

United States Patent Office 3,512,485
Patented May 19, 1970

3,512,485
MECHANISM FOR PLACEMENT OF SECOND COOKIE ON FROZEN ICE CREAM SANDWICH ELEMENT
Harold L. Komberec and Dillon K. Kilcup, both of N. 1511 Wall St. 99201, and Alfred T. Smith, W. 1012 Cleveland Ave. 99205, all of Spokane, Wash.
Filed Oct. 16, 1967, Ser. No. 675,695
Int. Cl. A23g 5/00
U.S. Cl. 107—1                                    5 Claims

ABSTRACT OF THE DISCLOSURE

A mechanism to accept a frozen slab of ice cream with a cookie on top thereof, turn the element over, heat the upper surface thereof to form a bond with a second cookie, place a second cookie thereon to establish a bond therewith, and deposit the entirety for further processing. The mechanism operates in a circular course to provide a continuous operation that is capable of receiving product and redepositing it upon the same line. The mechanism is adapted to comply with sanitary codes of the several states.

BACKGROUND OF INVENTION

Related applications

There are no applications directly related hereto filed in this or any foreign country, though an application for Letters Patent upon a mechanism for placement of a first cookie upon an ice cream sandwich element and for the process under which both mechanisms operate have been filed in the U.S. Patent Office.

Field of invention

This invention relates generally to the ice cream novelty field and more particularly to a mechanism that accepts a frozen slab of ice cream with a cookie on the upper surface thereof and places a second cookie on the uncovered surface with an adherent bond between the second cookie and ice cream.

Description of prior art

The ice cream sandwich embodying a slab of ice cream with one or two cookies associated therewith has become a standard item of commerce in the ice cream novelty field. Such products have heretofore generally been formed by some process during the soft stage of the ice cream so that an adherent bond will develop between ice cream and cookie after freezing. Many mechanisms for forming sandwiches in such fashion by hand or automatic machinery are known.

In the ice cream novelty industry of the present day, however, many novelties are commonly frozen in sharp freeze equipment having an associated palletized conveyor circulating within the freezing chamber for the freezing operation and without the chamber for the placement and removal of product. The instant invention is concerned with the placement of a second cookie upon a frozen slab of ice cream having one cookie already in place on top thereof.

The instant invention is distinguished from the prior art in that it must provide means of forming an adherent bond between frozen ice cream and cookie, whereas in the prior art this bond was formed automatically upon freezing since the cookie was placed during the soft stage of the ice cream. Our invention orientates the cookie and forms the bond by locally heating the ice cream surface to be covered, and placing and maintaining a second cookie thereon during the semi-fluid state of the ice cream to cause formation of the bond upon refreezing.

SUMMARY OF INVENTION

The instant invention was conceived to provide an automatic method of establishing a cookie with an adherent bond upon a frozen ice cream slab and especially to place a second cookie upon a frozen ice cream slab already having one cookie in place thereon.

To accomplish this function, a frozen preformed ice cream slab is received in a randomly timed fashion from a conveying structure with the surface to be covered lowermost. The product is turned over in a gravity-activated chute and delivered to a circular table where it is engaged by a conveying arm adapted to move it about the peripheral surface of the table. The frozen slab is conveyed beneath a heat source and means provided to maintain the product immediately adjacent the heat source by mechanical biasing so that a relatively thin portion of the upper surface will be melted. The product, with its upper surface in this melted condition, is conveyed beneath the cookie chute and a second cookie deposited thereover to form an adherent bond with the semi-fluid ice cream. The cookie is maintained in this position, generally by gravity, for a period of time until the semi-fluid portion has refrozen to form an adherent bond with the upwardly adjacent cookie. Thereafter the unified product is deposited for further processing.

In the process a cookie is deposited from the cookie reservoir upon each passage of a moving arm therebeneath and since there may not be a slab of ice cream carried by the moving arm on every passage, separate means are provided to remove any cookies not carried by an ice cream slab. These cookies may be collected for reuse at a later time.

The mechanism is of a circular operation so that product may be removed from a line and re-established thereon or upon a line immediately adjacent with relatively little difficulty.

The mechanism is adapted to operate with any particular configuration of ice cream or cookie by simple mechanical adaptation.

In providing such a structure it is:

A principal object of our invention to provide a mechanism allowing establishment of a cookie upon a relatively flat, planar surface of a frozen slab of ice cream and maintain an adherent bond therebetween.

A further object of our invention to provide such a mechanism that forms its bond by heating a relatively thin portion of the uncovered ice cream surface, placing a cookie thereon while the heated portion remains semi-fluid and allowing this portion to refreeze to form an adherent bond with the cookie in proper position thereon.

A still further object of our invention to provide such a device that is of a sanitary construction adapted to comply with the various sanitary codes of the several states.

A still further object of our invention to provide such a device that is of a sanitary construction adapted to durable nature, of simple and economic manufacture, and one that is otherwise well adapted for the uses and purposes for which it is intended.

Other and further objects of our invention will appear from the following specification and accompanying drawings which form a part of this application. In carrying out the objects of our invention, however, it is to be understood that its essential features are susceptible of change in design and structural arrangement with only one preferred embodiment being illustrated in the accompanying drawings, as required.

BRIEF DESCRIPTION OF DRAWINGS

In the accompanying drawings, wherein like numbers of reference refer to similar parts throughout:

FIG. 1 is a vertical, orthographic view of the top of our invention showing its various parts, their configuration and relationship from this aspect.

FIG. 2 is a partial orthographic side view of the invention of FIG. 1, showing the elements from this aspect.

FIG. 3 is a partial isometric view of the turn-over chute of our invention, showing how a product is turned upside down during its passage through the chute.

FIGS. 4, 5, 6, 7 and 8 show the various structural joints uniting the elements of the chute of FIG. 3 to illustrate how these various elements might move relative each other.

FIG. 9 is a partial vertical cross-sectional view through the drive shaft and bearing, showing the manner of motion of the top of our invention.

FIG. 10 is a partial vertical orthographic view showing one of the product carrying arms of our invention.

FIG. 11 is a top view of the carrying arm illustrated in FIG. 10, showing its elements from this aspect.

FIG. 12 is a partial top view of the raising rails, adapted to raise product against heat source.

FIG. 13 is a side view of the same raising rails illustrated in FIG. 12.

FIG. 14 is an orthographic side view, partially cutaway, of the lower portion of the cookie chute of our invention showing its manner of feeding and dispersal.

FIG. 15 is an orthographic top view of the same mechanism illustrated in FIG. 14.

FIG. 16 is a partial, vertical cross-sectional view through the air ports adapted to remove blank cookies from the table of our invention.

FIG. 17 is a linear diagrammatic view of the various steps of our machine process.

DESCRIPTION OF THE PREFERRED EMBODIMENT

Referring now to the drawings in more detail and particularly to those of FIGS. 1 and 2, it will there be seen that our invention comprises essentially, a circular supporting table 20 rotatably journaling product moving element 21 and carrying turn over chute 22, heating element 23, cookie placement member 24, and deposition element 25.

Supporting table 20 includes planar table 26 of partial circular configuration having a peripheral segment 27 removed to aid in deposition of product and a downwardly depending peripheral rim 28 to give additional structural rigidity and provide means for attaching various elements. Table 26 is supported by depending legs 29 on some suitable surface therebeneath. Preferably a similar circular shield 30 is provided at a spaced distance below the table 26 to shield the bottom of the table and the various working parts carried on its lower surface.

Orifice 31 in the medial central portion of table 26 carries thrust bearing 32 journaling upwardly extending drive shaft 33. This shaft irrotatably mounts moving plate flange 34 by means of key 35 carried in cooperating ways therebetween.

Product moving element 21 includes flat circular plate 37 communicating with flange 34 by bolts extending therethrough into threaded engagement with the flange. The plate 37 is somewhat less diameter than table 26 to provide a pathway between the peripheries of the two elements for product formation and is maintained substantially parallel to and at a spaced distance above table 26 by its bearings before-described. Above the periphery of the plate 37 and extending radially outwardly therefrom at spaced peripheral distances, are the plural product moving arms, designated generally as 38. These product moving arms are releasably positioned upon plate 37 by bolts 39 extending through appropriate holes therein into threaded engagement with the plate.

The product moving arms themselves are shown in detail in the illustrations of 10 and 11 where they are seen to include flat plate arm 40, having holes 41 to receive bolts 39, communicating by outwardly and downwardly extending throat 42 with cookie engaging portion 43 having spaced lower channels 44 to allow passage of the element over the raising rails and upwardly extending cookie engaging dogs 45 adapted to remove a cookie from the cookie magazine.

Turn-over chute 22 is illustrated in FIG. 3, where it is seen to include the entrance chute 46 having upwardly extending sides 47 to maintain product thereon, medial turn-over element 48 which alters the course of product to proximate ninety degrees (90°), and lowermost exit chute 49 adapted to direct the course of the product onto the receiving table where it might be engaged by product moving arms 38. These various chute elements are all positionable relative each other and table 26 by means of their mounting upon common shaft 50, the entrance chute being mounted by the bracket illustrated in FIG. 4, the medial chute by the bracket illustrated in FIG. 5, the top of the medial chute by the bracket illustrated in FIGS. 7 and 8.

The heating element is illustrated in FIGS. 1 and 2, where it is seen to contain heating box 56 having a substantially planar, downwardly facing surface adapted to communicate with the upper surface of product therebeneath, services by heat generating unit 57 communicating therewith by means of heating elements 58. Preferably this unit is thermostatically controlled and heated by electricity for convenience and sanitation. The members are maintained in proper position immediately over and at a spaced distance above the course of product travel along the outer periphery of table 26 by brackets 59 communicating therewith and preferably this communication is somewhat adjustable within appropriate limits.

On product table 26 immediately below heating surface 56 are raising rails 60, shown in FIGS. 12 and 13. These are elongate curved elements extending substantially along the course of product travel above table 26 and below heating surface 56. The rails have downwardly extending ends 61 communicating through the top of table 26 to provide an access ramp for product passing thereover. These rails are spaced and positioned to communicate with the opposed lateral portions of product passing thereover to engage the undersurface thereof. The rails 60 are mounted on downwardly depending spring legs 62 projecting downwardly through holes 63 in the table to carry on their under portion compression spring 64 between the under surface of table 26 and spring washers 65 carried at the lowermost extension thereof. This construction then biases rails 60 to an upwardly extended position immediately adjacent the undersurface of heating surface 56 to urge product thereagainst.

Cookie placement member 24, shown in FIGS. 14 and 15, includes base 66, positioned at a spaced distance above table 26 immediately forward of heating element 23, by downwardly depending legs 67 communicating with rim 28 of the table by bolt-nut combination 68 extending through the two members. This base has central orifice 69 adapted to allow vertical passage of a cookie therethrough. Cookie chute 70 is supported above base 66 to maintain a supply of cookies and permit their gravity feed through orifice 69. Cookie support element 71, with its elongate axis extending parallel to the direction of product travel, is maintained on the undersurface of base 66 to prevent the vertical passage of cookie therebeneath. The upper surface of this element is at a spaced distance, substantially equal to one cookie thickness, below the undersurface of base 66 so that a cookie may slide forwardly off support element 71. This support element is maintained in position by bolts 73 extending through upwardly extending fastening arm 72 into threaded engagement with base 66. The cookie support element 71 is so configured to allow passage of product moving arms 38 and yet allow cookie engaging dogs 45 to remove a cookie from support element 71 forwardly off thereof.

Immediately radially forward of cookie placement member 24 is the blank cookie removal means, illustrated in FIG. 16, where it is seen to include a lower air chamber 74 supplied by pressurized air from a source not shown through pipe 75. Angled plural ejection orifices 76 extend from chamber 74 through table 26 in the angled fashion shown to allow air carried therethrough to force a blank cookie off of table 26. The air pressure through orifices 76 is adjusted to remove a cookie but not be sufficient to remove a slab of ice cream with cookie in place thereon.

An appropriate catching element (not shown) may be established, radially outward from the holes 76, to catch and hold removed blank cookies for further use.

Depositing element 25 includes the elongate arcuate deposit member 77 adapted to extend to various positions within the removed segment 27 along the product course on table 26. Deposit member 77 has medial arcuate fastening slots 78 to cooperate with a bolt extending therethrough and into threaded engagement with table 26 to allow angular positioning of the member to cause deposit of product passing thereover in an appropriate angular position. A secondary conveying means (not shown) may be associated with this area of product deposit to remove finished product for further processing.

Having thusly described the structure of our invention, its operation can now be understood.

Ice cream slab 79 of preconfigured shape, with first cookie 80 thereon and uncovered side 81 lowermost, is presented in untimed fashion to the upper portion of turn-over chute 22. These products are in hard frozen condition, usually at a temperature of some thirty to sixty degrees (30° to 60°) below zero on the Fahrenheit scale.

The product passes downwardly through turn-over chute 22 and during its course of travel is turned over with uncovered side 81 uppermost and first cookie 80 lowermost as the product moves onto the product course table 26. The product moving plate will be revolving in a counter-clockwise direction, according to the illustration of FIG. 1, and the particular product will be engaged by cookie engaging portion 43 of product moving arm 38. Since the product is slidably supported on its undersurface by table 26, it will be moved by the product moving arm in a circular course along table 26 and will come to the forward end of raising rails 60. It will pass over these rails and be raised thereon so that the upper uncovered surface 81 of ice cream slab 79 will pass immediately adjacent the undersurface of heating element 56 to be heated thereby. The dimensioning of raising rail 60 must be appropriately regulated to accomplish this end with only a slight pressure of product against the undersurface of heating element 56.

The ice cream slab 79 will continue to be carried along the circular product course of table 26 out from under heating surface 56 and to the cookie placement member 24. As the moving arm moves under the cookie placement member, the height is so regulated that cookie engaging dogs 45 engage the rearward lateral surface of the lowermost cookie held in the placement member and move it forwardly with an identical motion to that of the ice cream slab 79 therebelow, until the cookie is moved sufficiently forwardly to pass off cookie support element 71 at which time gravity will act upon it and bring it substantially vertically downward upon the uncovered and then melted surface 81 of the ice cream slab therebelow. At this time, since the ice cream will be semi-fluid on its top, it will form a semi-adherent bond with the cookie.

The speed of circular motion of product moving plate 37 must be such as to bring the product under the cookie chute and allow deposit of the cookie thereon during the existence of the semi-fluid state of the upper surface of ice cream slab 79. The remaining course of transit of the cookie along the product course of plate 26 must be such as to allow this liquid portion of the ice cream slab to refreeze to form an adherent frozen bond between ice cream and cookie.

If a cookie has been removed by a product moving arm carrying no ice cream slab, when this product moving arm passes over the upward orifice of air holes 76, the air pressure therethrough will be sufficient to move the cookie laterally off table 26 and preferably into some appropriate container (not shown), but at least out of the course of travel of product over table 26.

The product continues in its course of travel around the product course of table 26 to the end of deposit element 77. As product is moved over the end of the deposit element, it will have no support and will fall vertically downward therefrom by action of gravity. Other means (not shown) may communicate with our mechanism at this point to remove product for further processing according to the usual customs and desires of the trade.

The foregoing description of our invention is necessarily of a detailed nature so that a specific embodiment of it might be set forth as required, but it is to be understood that various modifications of detail, and rearrangement and multiplication of parts may be resorted to without departing from its spirit, essence or scope.

Having thusly described our invention, what we desire to protect by Letters Patent, and

What we claim is:

1. A mechanism of the nature aforesaid to establish a cookie upon an uncovered horizontal surface of a slab of frozen ice cream including, in combination:
   a supporting surface having a course for product travel therealong;
   means of product imput to establish frozen slabs of ice cream in the course of product travel;
   a product moving element with plural product moving arms to traverse the product along its course;
   a heating element immediately forward of the means of product imput to heat the upper surface of the frozen ice cream slabs to melt the upper portion thereof;
   a cookie placement member forward of the heating element to place a cookie upon the melted upper surface of the partially frozen ice cream slab to form a semi-adherent bond therebetween;
   a course of product travel to allow at least partial refreezing of the melted ice cream to form an adherent bond between cookie and ice cream slab; and
   means of product removal.

2. A mechanism of the nature aforesaid to establish a cookie upon an uncovered horizontal surface of a slab of frozen ice cream comprising, in combination:
   a supporting circular table having an arcuate course for product travel about the periphery thereof;
   a product moving element having a plate concentrically positioned and adapted for rotation at a spaced distance above said table with plural product moving arms extending therefrom at spaced distances, to move product supported on said table along the product course thereof;
   means of product imput to the product course about the supporting table;
   a heating element immediately forward of the means of product imput, including a relative flat, planar heating surface substantially parallel to and at a spaced distance above the product course, with product raising rails carried by the table below the heating element to bias the product passing between the rails and the heating element to an upward course against the heating element to heat a portion of the upper surface of the product;

a cookie placement member, forward of said heating element, including a base with a central orifice therein for vertical cookie passage and an associated cookie chute to present cookies by gravity flow through said orifice, with an elongate cookie support element extending in the direction of product travel across a part of the bottom of said chute to support the lowermost cookie against further vertical displacement, said cookie support being adapted to allow passage of product moving elements therebeneath and the removal of the lowermost cookie thereby for placement on the slab of ice cream carried by said product moving element;

means of removing cookies not carried by slabs of ice cream from the supporting table; and means of removing the combined cookie and slab of ice cream from said mechanism by vertical displacement after formation of an adherent bond therebetween.

3. The invention of claim 2 wherein the means of removing cookies not carried by slabs of ice cream comprise:

means to supply pressurized gas through a plurality of spaced aligned holes angled to a radially outward direction and adapted to lift only a blank cookie off the supporting table.

4. The invention of claim 2 wherein the means of product input are further characterized by:

a curved, gravity activated turn-over-chute to receive a frozen ice cream slab and turn it top for bottom during its gravity passage therethrough.

5. In a mechanism for the placement of cookies with an adherent bond upon a frozen slab of ice cream, a heating element including, in combination, means providing a substantially planar heating surface at a spaced distance above the course of travel of product;

means of supplying controlled heat to said heating surface to melt a portion of the upper surface of the frozen ice cream product; and means of biasing a product traveling over a supporting surface and under the heating surface to cause aforesaid melting.

References Cited

UNITED STATES PATENTS

| | | |
|---|---|---|
| 2,433,140 | 12/1947 | McCaughey. |
| 2,715,878 | 8/1955 | Egerton. |
| 2,923,257 | 2/1960 | Monaco. |
| 3,363,586 | 1/1968 | Jernigan et al. |

WALTER A. SCHEEL, Primary Examiner

A. O. HENDERSON, Assistant Examiner